United States Patent Office  
3,337,288  
Patented Aug. 22, 1967

3,337,288
REACTIVE COLORING MATTER, PROCESSES FOR PRODUCING THE SAME AND PROCESSES FOR COLORING ARTICLES WITH THE SAME
Shojiro Horiguchi, Kitatama-gun, Tokyo, and Michiei Nakamura, Urawa-shi, Saitama-ken, Japan, assignors to Dainichiseika Color & Chemicals Mfg. Co., Ltd., Chuo-ku, Tokyo, Japan, a corporation of Japan
No Drawing. Filed Aug. 20, 1963, Ser. No. 303,413
Claims priority, application Japan, May 6, 1963, 38/22,546
15 Claims. (Cl. 8—4)

The present invention relates to a new reactive coloring matter, processes for producing the same and processes for coloring articles with the same.

A first object of the present invention is to provide a new reactive coloring matter which can be applied to a wide range of uses of conventional dyes and pigments and can color articles better than prior known conventional coloring matter.

Another object of the present invention is to provide some processes for producing said new reactive coloring matter having excellent characteristics.

A further important object of the present invention is to provide various processes for coloring articles with said new reactive coloring matter.

For the first object, the present invention provides a reactive coloring matter which is a polymer having in its structure at least two chromogens having no water-solubilizable radical in themselves, at least two reactive radicals and at least one solubilizable or dispersible radical.

The polymer forming the reactive coloring matter of the present invention must have in its structure at least two reactive radicals selected from the below mentioned radicals and the like:

Said polymer may also have, in addition to the above mentioned reactive radicals, at least one radical selected from the below mentioned radicals and the like:

| Name of radicals: | Structure |
|---|---|
| Hydroxyl | —OH |
| Mercapto | —SH |
| Amino | —NH$_2$ |
| Imino | —NH— |
| Carboxyl | —COOH |
| Sulfo | —SO$_3$H |
| Carboamide | —CONH$_2$, —CONH— |
| Sulfoamide | —SO$_2$NH$_2$, —SO$_2$NH— |
| Urea | —NHCONH$_2$, —NHCONH— |
| Ureido | —CONHCONH— |
| Urethane | —OCONH— |
| Methylene dicarbonyl | —COCH$_2$CO— |

The polymer having the above mentioned radicals as a base for forming the reactive coloring matter of the present invention, that is, the polymer to be used in producing the reactive coloring matter of the present invention is in a very wide range. But, substantially it includes the following largely divided groups:

(1) Such cross-linkable polymers having methylol radicals causing cross-linking when heated or when an acid catalyst is added or derived radicals thereof, for example, —CH$_2$OR and —CH$_2$SO$_3$Na as, for example, (a) such condensates as urea-formaldehyde, melamine-formaldehyde, guanidine-formaldehyde, phenol-formaldehyde, aniline-formaldehyde, casein-formaldehyde and carboamide-formaldehyde, co-condensates thereof and amino-, polyether- and alcohol-modified condensates thereof, (b) products obtained by reacting amino resins or amide resins with formaldehyde, for example, products obtained by making polyamide, polyurea, polyacrylamide and polydiaminovinyl triazine react with formaldehyde and (c) polymers of N-methylolacrylamide, N,N'-dimethyloldiaminovinyl triazine and N-methylolvinyl urea or copolymers thereof with other monomers.

(2) Condensation products of such methyl compounds causing cross-linking when heated or when an alkaline catalyst is added as, for example, acetone-formaldehyde, methylethylketone-formaldehyde, etc.

(3) Such cross-linkable polymers having epoxy or halohydrin radical causing cross-linking when heated or when a basic catalyst or polycarboxylic acid is added as, for example, (a) condensation products of polyamine-epihalohydrin, polyalcohol-epihalohydrin, polyphenol-epihalohydrin, polyamide-epihalohydrin, polycarboxylic acid-epihalohydrin and polyurea-epihalohydrin, co-condensates thereof and ones in which dihalohydrin is used instead of said epihalohydrin, (b) condensation products in which butadiene dioxide, dicyclopentadiene dioxide, vinylcyclohexene dioxide, dipentene dioxide and the like are used instead of epihalohydrins in (a) above, (c) such products obtained by introducing epoxy radicals into already produced resins as bases as, for example,

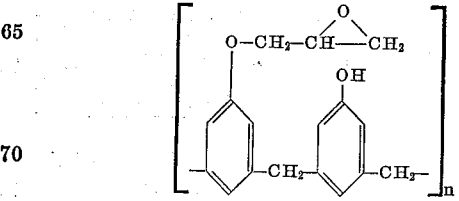

obtained by using a phenol resin as a base and

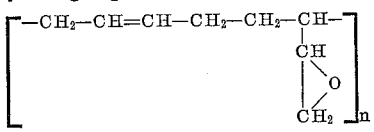

obtained by using polybutadiene as a base and (d) homo- or co-polymers of glycidyl methacrylate, allyl-glycidyl ether and the like.

(4) Such cross-linkable polymers which will be polymerized when heated or when a readily decomposable peroxide or diazo compound is added or a reducing agent is added as, for example, homo- or co-polymers of diallyl phthalate, ethylene glycol diacrylate, diacryl-methane and N,N′-methylene-bis-acrylamide, unsaturated polyesters, drying oils, unsaturated fatty acid modified alkyds and the like.

The polymer forming the reactive coloring matter of the present invention must also have in the structure at least one radical solubilizable or dispersible in water or oil. However, in case the already described reactive radicals contained in said polymer are solubilizable or dispersible themselves, such radical need not be separately contained. For the hydrophilic radical solubilizable or dispersible in water, at least one polar radical is properly selected from anionic, nonionic and cationic hydrophilic radicals according to the object reactive coloring matter. As typical thereof can be enumerated such anionic hydrophilic radicals as carboxyl (—COOH), sulfate (—OSO$_3$H)

and sulfo (—SO$_3$H) radicals, such nonionic hydrophilic radicals as hydroxyl (—OH), ether (—O—) and carboamide (—CONH$_2$) radicals and such cationic hydrophilic radicals as amino (—NH$_2$), imino (—NH—), tertiary amino

and pyridine

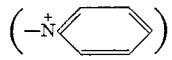

radicals. On the other hand, for the hydrophobic radical solubilizable or dispersible in oil is properly selected at least one non-polar group from aliphatic hydrocarbon radicals having 2 to 18 carbon atoms, aromatic and cyclic hydrocarbon radicals and ester, ether, carboamide, sulfoamide, urea and urethane condensates thereof according to the object reactive coloring matter.

For the chromogen which has no water-solubilizable radical in itself and which is bonded with the polymer forming the reactive coloring matter can be enumerated such various known pigments as phthalocyanine pigment series, for example copper phthalocyanine blue, copper phthalocyanine green, etc.; vat pigments and related compounds, for example thioindigo pigments, anthraquinone pigments, perinone pigments, perylene pigments, etc.; polycyclic pigments, for example dioxazine pigments, quinacridone pigments, etc.; azo pigment series, for example azo coupling pigments, azo condensation pigments, etc.; sulfur pigments; basic lake pigments; and the like.

The processes for producing the new reactive coloring matter of the present invention for the second object shall now be described.

The first of the producing processes according to the present invention is a process for producing a reactive coloring matter comprising introducing a diazonium radical by any normal method into the above defined water-insoluble chromogen and polymerizing an addition-polymerizable monomer containing a monomer having reactive radicals at least partly by using as a polymerization initiator the obtained diazonium compounds of said chromogen.

Further, the above mentioned polymerization of the addition-polymerizable monomer with the obtained diazonium compound of the chromogen as a polymerization initiator can be made by any of various known types of addition-polymerization such as, for example solution-, block-, emulsion-, suspension-polymerizations and the like.

The second producing process according to the present invention is a process for producing a reactive coloring matter comprising introducing an addition-polymerizable radical by any normal method into the above defined water-insoluble chromogen and then copolymerizing with it an addition polymerizable monomer containing a monomer having reactive radicals at least partly.

Further, to the subsequent copolymerization can be applied such known method as is used in the copolymerization in the case of producing ordinary synthetic resins.

The third producing process according to the present invention is a process for producing a reactive coloring matter comprising introducing a condensable radical by any normal method into the above defined water-insoluble chromogen and then polycondensing with it a condensable monomer having a polymer forming ability. To the subsequent polycondensation can be applied any polycondensation applied to the case of producing ordinary synthetic resins.

The fourth producing process according to the present invention is a process for producing a reactive coloring matter comprising introducing a condensable radical in the same manner as in the above third process into the above defined water-insoluble chromogen and then condensing with it a polymer having a condensable reactive radical.

The reactive coloring matter produced by any of the above described first to fourth processes according to the present invention is a product having in the structure at least two chromogens water-insoluble themselves, at least two reactive radicals and further, in some cases, at least one radical having both functions of a reactive radical and a solubilizable or dispersible radical.

In case the above mentioned product has already in the structure a solubilizable or dispersible radical, it can be used as it is as a reactive coloring matter for the object of the present invention. On the other hand, in case said product has no solubilizable or dispersible radical or is desired to give more solubilizable or dispersible radical, it will be necessary to apply the following fifth process according to the present invention to the product obtained by any of the above mentioned first to fourth processes.

The fifth is a process comprising making a reactive compound having at least one hydrophilic or hydrophobic radical react on a polymer having in the structure at least two chromogens having no water-soluble radical in themselves and at least two reactive radicals so that at least one said hydrophilic or hydrophobic radical may be introduced into said polymer.

For the hydrophilic or hydrophobic radical to be introduced into the polymer, as described above, all kinds of solubilizable or dispersible radicals can be selected for the object. The substantial methods of introducing such radicals are, for example, as follows:

(1) Introduction of water-solubilizable or dispersible radicals.
    (A) Introduction of anionic hydrophilic radicals.
        (a) A carboxyl radical is introduced by using acrylic acid or chloroacetic acid.
        (b) A sulfo radical is introduced by using sodium bisulfite.
        (c) A sulfo radical is introduced by using sulfamic acid.
        (d) Such compound having a double bond as, for example, allyl isothiocyanate is made to react and the product is esterified by further making sulfuric acid act thereon.
    (B) Introduction of nonionic hydrophilic radicals.
        (a) A polyether type radical is introduced by using ethylene oxide.
        (b) A polyalcohol type radical is introduced by using glycerine or glycidol.

(c) A carbonamide type radical is introduced by using acrylamide.

(C) Introduction of cationic hydrophilic radicals.
  (a) An amino or imino radical is introduced by using a lower amine.
  (b) A pyridinium radical is introduced by using pyridine hydrochloride.
  (c) An imino radical is introduced by using ethylene imine.
  and so on.

(2) Introduction of oil-solubilizable or dispersible radicals.

By using a reactive compound having such hydrophobic hydrocarbon radical as, for example, a higher aliphatic, aromatic amine, alcohol, carboamide, methylol carboamide, isocyanate, urea, urethane or ethylene urea or a phenolic derivative, said hydrocarbon radical is introduced.

The processes for coloring articles with the new reactive coloring matter obtained as described above which processes are the third object of the present invention shall now be described.

That is to say, the coloring processes according to the present invention are processes for coloring articles by using as a coloring matter a new reactive coloring matter composed of a polymer having in the structure at least two chromogens having no water-solubilizable radical in themselves, at least two reactive radicals and at least one solubilizable or dispersible radical. More particularly, they are new processes for coloring articles comprising treating an article to be colored with said reactive coloring matter as dissolved or dispersed in any vehicle and subjecting it to such after-treatment as heating, addition of a catalyst or a heavy metal or variation of pH so that said coloring matter may be made insoluble.

The reactive coloring matter of the present invention can be used for different uses depending on the kind of the solubilizable or dispersible radical contained therein. That is to say, the reactive coloring matter in which is introduced a hydrophilic radical can be extensively utilized as a material similar to a dye in such conventional uses of dyes as, for example, dyeing fibrous materials. On the other hand, the reactive coloring matter in which is introduced a hydrophobic radical can be also extensively utilized, as such coloring matter as for paints and printing inks in the conventional uses of pigments.

That is to say, the reactive coloring matters of the present invention having in the structure radicals solubilizable or dispersible respectively in water, organic solvents, plasticizers or any other vehicles can be easily dissolved or finely dispersed in such vehicles by merely being mixed and stirred in them. When such after-treatment as heating, addition of a catalyst or a heavy metal or variation of pH is then applied, the reactive radicals of the polymer forming said coloring matter will be made to react with each other or with the vehicle so that said coloring matter may be cross-linked to be of a higher molecular weight. Thus, the solubilizability or dispersibility will be so negligible as compared with the molecular weght of said cross-linked coloring matter that the coloring matter will be able to be made insoluble.

The effects of the processes for coloring with the new reactive coloring matter of the present invention as compared with those of conventional dyes and pigments shall be concretely explained in the following.

For example, in coloring a paint, ink, fabric or synthetic resin with a conventional pigment, the dry pigment has been kneaded with a solvent, varnish, plasticizer and the like. However, as such pigment aggregates or flocculates for the two or three times during the drying process, the diameter of the particle will be so large that the pigment will not disperse well and will be low in the tinting strength. In order to correct it, the dispersion is increased by the addition of surface active agent. But in this case, some undesirable phenomena such as migration occur. Moreover, since the pigment is merely dispersed in the resin or the resin film, the properties of the resin such as its abrasion resistance, its hardness and the like tend to be reduced and thereby invite cracking and delamination. On the other hand, the reactive coloring matter of the present invention has many chromogens or pigment molecules bonded to the polymer as described above, is quite different in the physical and chemical properties from the conventional pigment, does not aggregate in the drying process, is especially high in the tinting strength and does not reduce the physical properties, specifically electrical characteristics of the resin. Further, the chromogens bonded with the polymer which has radicals solubilizable or dispersible in oil have such high dispersibility in solvents and varnishes that, when they are made a paint or ink, it will be transparent, will be high in concentration and will be favorable in spreading. Further, as the carrier for the chromogens is a polymer having reactive radicals, when such proper aftertreatments as are described above are applied after the article to be colored was colored, said reactive radicals will link each other or the functional radical of the article to be colored and said polymer will be cross-linked to be a higher polymer. Therefore, the reactive coloring matter of the present invention has advantages that the colored painted film is higher in resistance against solvents and chemicals, is plasticized within, has therefore some elasticity, is thus high in abrasion resistance and tensile strength and will neither crack nor delaminate even after a long period. Further even in case the reactive coloring matter of the present invention is to be used to color the interiors of synthetic resins and synthetic fibers, if any polymer and dispersible radical high in compatibility with them are selected and used, it will be high in dispersibility and tinting strength, will cause no migration and will not reduce the physical properties or specifically the electrical characteristics of such resins themselves but will be able to further elevate their effects by cross-linking.

On the other hand, in coloring with conventional water-soluble colors, for example, known reactive dyes, each chromogen has its own functional radical and such functional radical is connected with the functional radical, for example, of a fibrous substance by covalent bond so as to color the materials. However, in such case, the dye which has been hydrolyzed with water which is a medium or the dye which has lost the functional radicals by reacting with a size will no longer be able to react with the fibrous materials and will not only become a loss but also reduce the fastness as a whole. Further, the conventional dyes having such hydrophilic radical as a sulfo radical or carboxyl radical in the chromogen itself, if not sufficiently dyed on fabric materials, will again dissolve or disperse in water when washed and will stain white places. Even in case they are sufficiently dyed due to the variation of pH or the like, they will often vary the hue.

On the other hand, when the reactive coloring matter of the present invention in which is introduced a radical solubilizable or dispersible in water is made to permeate a fibrous materials in a state having affinity with water and then the reactive radicals of the polymer forming said coloring matter are made to react with each other or with the functional radical of the fibrous materials by such means as heating, evaporation of pH variation, the polymer will be able to be easily cross-linked to be a higher polymer. Thus, the coloring matter of the present invention will become so insoluble and stable within the fibrous materials that, even if the materials is washed with hot water, acid or alkali, the color will not seep out again. Therefore, the coloring matter of the present invention is so high in the fixing ratio abrasion resistance and other fastnesses that not only cotton such cellulose fibers as viscose rayon and acetate rayon fibers but also wool and such synthetic fibers as polyester, polyamide, polyacrylonitrile and polyvinyl formal fibers can be uniformly dyed with it.

Further, in the case of coloring a material solution for producing fibers, papers and nonwoven fabrics, conventional colors will act as impurities and will reduce such physical properties as, for example, the tensile strength and tearing, bending and abrasion resistance of the colored objects. On the other hand, the coloring matter of the present invention will rather improve the strength of the colored substance.

Further, according to the present invention, the papers, textiles, leathers, wooden articles, hard boards, concrete walls, metal plates, glass plates and the like works colored with the present coloring matter will have been resin-treated simultaneously with the coloring and will be given such desirable property as proofness against stain, water, fire and moths.

As described above, the processes for coloring with the new reactive coloring matter of the present invention are far superior to any conventional coloring processes in so many points and, as evident also from the below mentioned examples, they can be applied to coloring of articles in such wide range that they are technically epochal.

Further, the present invention includes the following processes as modifications of the above described basic processes for coloring articles.

That is to say, the first modification of the coloring processes of the present invention is a process for coloring articles with a reactive coloring matter of the present invention to which is added a compound having at least two functional radicals which can react with said reactive coloring matter. In this modification, as the compound acting as a cross-linking agent on the polymer of said reactive coloring matter is also used, the cross-linking of said polymer will be accelerated and said coloring matter will be more effectively made insoluble and stable. For the compound to be used, any of such compounds generally used as cross-linking agents as, for example, formaldehyde, glyoxal, trimethylolmelamine, hexamethylolmelamine, polyamine, alkylenebisethyleneurea and polycarboxylic acid may be used as properly selected according to such conditions as the kind of said reactive coloring matter and the coloring method.

The second modification of the coloring processes of the present invention is a process for coloring articles with said reactive coloring matter to which is added a primary condensate of a thermosetting resin which can react with said coloring matter, in place of or in addition to cross-linking agent used in the first modification.

The third modification of the coloring processes of the present invention is a process for coloring articles with a reactive coloring matter to which is added a thermoplastic resin in place of or in addition to the cross-linking agent or thermosetting resin used in the first and second modifications.

Such addition will react with the reactive radicals of the polymer of said coloring matter, will accelerate the cross-linking of the polymer and will give an excellent operational effect of improving the adhesion of the coloring matter to the articles and the resistance and fastness of the articles.

Further, the fourth modification of the coloring processes of the present invention is a process for coloring articles with a reactive coloring matter to which is added a latex. The fourth modification can be simultaneously carried out together with the first, second or third modification.

In order to concretely explain such new reactive coloring matter, processes for producing the same and processes for coloring articles by using the same according to the present invention as are described above, typical examples of the processes for producing the coloring matter of the present invention and the processes for coloring articles by using the same shall be given in the following examples in which all parts are by weight.

Example 1

2.5 parts of tetra-(4-amino) copper phthalocyanine blue paste (measured by weight as the pure pigment) were throughly mixed with 15 parts of 30% aqueous hydrochloric acid solution and then made up to 100 parts by the addition of water. The solution was kept at 0° C. in an ice-bath and diazotized for 30 minutes by the addition of 1.5 parts of sodium nitrite. After filtration, an aqueous solution of diazotized copper phthalocyanine blue was obtained.

A mixture was then formulated as follows:

| | Parts |
|---|---|
| An aqueous solution containing 2% diazotized copper phthalocyanine blue | 90 |
| Acrylamide | 7 |
| Methyl acrylate | 3 |
| | 100 |

When this solution was kept 10 minutes at a room temperature and then at 50° C. for 20 minutes, polymerization occurred with the continuous foaming. The end point of the polymerization was fixed at a point where no foaming occurs and a point where color of the solution changed from greenish blue to sky-blue. After filtration, 250 parts of methanol were added to the filtrate to precipitate the colored resin. By adding them in an open air, blue resin powder was obtained.

This powder could be easily dissolved in water to form a clear blue solution.

5 parts of the blue resin powder which were synthesized according to the method described above were dissolved in 95 parts of water to make blue aqueous solution. 3 parts of formalin were added in it and methylolation was carried out at 65° C. for 25 minutes under the condition of pH 9 which was regulated by means of adding 5% aqueous sodium carbonate solution.

By adding 300 parts of methanol, a colored resin was obtained. This resin was dried in an open air to obtain blue resin powder. The blue resin powder was quite soluble in water and clear blue aqueous solution was obtained.

Example 2

3 parts of blue colored resin which were synthesized according to the first step of method described in Example 1 were dissolved in 97 parts of water to make blue aqueous solution. 0.5 part of melamine and 5.4 parts of formalin were added into them. The pH of the solution was regulated to 7.5 by the addition of 5% aqueous sodium carbonate solution. Clear solution was obtained by heating then at 70° C. for 10 minutes.

After cooling down to 45° C., 0.2 part of sulfamic acid and 2.0 parts of 30% aqueous hydrochloric acid solution were added together to the above solution, and then by lowering the pH to 4.5 the condensation occurred. About 10 minutes later, taking a drop of reactant solution, the condensation degree was detected by dropping it into a large quantity of cold water and checking the point where resinous precipitate would be formed.

Then 0.8 part of 20% aqueous sodium hydroxide solution was added to the solution which made the pH of the reactant about 10, at which point a blue colored resinous solution was obtained. At this stage, of the precipitation, nothing could be found when one drop of reactant was dropped into a large amount of cool water.

Example 3

To a blue colored resinous solution which was synthesized according to the method described in Example 2, 3 times in volume of methanol was added, then blue colored resinous precipitate was obtained. This resinous precipitate was dissolved into water to dilute them to 5% (in solid) aqueous solution.

According to the following composition, emulsion-polymerization was carried out at 55° C. 1 hr., 65° C. 4 hrs., and 80° C. 2 hrs., with a continuous agitation and heating, and thus colored latex was obtained.

| | Parts |
|---|---|
| Blue colored resin solution mentioned above | 75.0 |
| Butyl acrylate | 9.5 |
| Vinyl acetate | 1.5 |
| Vinylidene chloride | 9.0 |
| Acrylamide | 0.2 |
| Sodium phosphate | 0.5 |
| Sodium alkyl benzene sulfonate | 0.5 |
| Potassium persulfate | 0.04 |
| Water | 3.76 |
| | 100.00 |

Similar colored latex was also obtained using the blue colored resinous solution which was synthesized according to Example 1 instead of the method in Example 2.

Example 4

5 parts of colored resin which was synthesized according to the method described in the first step of method in Example 1 were dissolved in 95 parts of water to give the blue colored resinous aqueous solution. 10 parts of melamine and 43 parts of formalin were added to the colored solution. Methylolation reaction was carried out at 70° C. after the pH of the reactant was regulated with 5% aqueous sodium carbonate solution to 7.5. After the complete dissolution was achieved by the addition of 50 parts of butanol and 1 part of phosphoric acid, dehydration reaction was carried out at 90° C. by circulating the butanol only, using the water trap from the mixture of butanol and water, which was stripped off and collected from the reactant. After the reaction was completed, by taking off the excess butanol under a reduced pressure, and by concentrating the reactant to a viscous solution containing 80% of solid content, butyl-methylol-melamine type blue resinous solution was obtained.

Example 5

Tetra-(4-amino) copper phthalocyanine green was diazotized according to the method of Example 1.

On the other hand, the emulsion was prepared according to the following composition with a strong agitation.

| | Parts |
|---|---|
| Methylmethacrylate | 13 |
| Ethylacrylate | 5 |
| Glycidylmethacrylate | 2 |
| Water | 80 |
| | 100 |

To the thus obtained emulsion, 100 parts of 2% aqueous solution of diazotized copper phthalocyanine green were added and polymerization was carried out for 10 minutes at a room temperature, at 50° C. 2 hrs. and then at 60° C. 2 hrs. By adding 500 parts of methanol, colored resin precipitated. After washing and drying them, resinous powder was obtained. This powder was quite soluble into esters, ketones and the solution is very clear green.

Example 6

25 parts of glycerine were reacted together with 190 parts of linseed oil in a reaction vessel at 180° C. for 2 hrs. under the circulation of nitrogen gas. 0.2 part of zinc acetate and 10 parts of green resinous powder which was synthesized according to the method in Example 5 were added in the form of 60% of xylene solution to the above reaction mixture.

Elevating the temperature to 140° C., gradually, and stripping off the mixed vapour of alcohol and xylene, reaction was carried out. The reaction was then carried out for 30 minutes at 200° C. and thereafter was continued for 4 hrs., at 230 to 250° C. with the addition of 60 parts of phthalic acid. A viscous, alkyd type green solution was obtained.

Example 7

14 parts of naphthoic metha-amino-anilide were dissolved into 126 parts of acetone. After complete dissolution was done, 4.7 parts of pyridine was added to the solution. 5.3 parts of methacrylic chloride was added to the solution dropwisely within 15 minutes at the temperature 5° C. constant. After 2 hrs. stirring, filtering and washing the resulting materials, naphthoic acid-(methacrylamide)-anilide was obtained.

By dissolving it gradually into an aqueous sodium hydroxide solution, a grounder was obtained.

After the meta-amino para-methoxybenzamide was diazotized, a coupling process was carried out with naphthoic acid in alkaline according to ordinary rules of coupling, red pigment was thus obtained having an addition-polymerizable group as its component.

Then, the polymerization was carried out according to the following formulation and conditions.

Formulation:

| | Parts |
|---|---|
| Addition-polymerizable red pigment described above | 10 |
| Acrylamide | 10 |
| Polyvinyl alcohol | 0.2 |
| Potassium persulfate | 0.3 |
| Water | 79.5 |
| | 100.0 |

Conditions:

| | Hrs. |
|---|---|
| Temperature 70° C., Time | 1 |
| Temperature 80° C., Time | 2 |

After the pH of the solution was adjusted by the addition of 5% solution of sodium carbonate the pH to 9, 12 parts of 37% formalin were added and a methylolation was carried out for more than 20 minutes. 300 parts of methanol were added into the reactant to obtain precipitate. Red color resin powder was obtained by air drying the precipitate.

Example 8

5 parts of red color resin powder which have been obtained according to the method described in Example 7 were dissolved into 95 parts of water to obtain red aqueous solution.

The red solution obtained above was reacted together with 10 parts of melamine, 25 parts of formalin, 50 parts of butanol and 1 part of phosphoric acid according to the method described in Example 4. Butylated-methylol melamine type red resinous solution was obtained.

Example 9

| | Parts |
|---|---|
| Addition-polymerizable red pigment obtained according to the method described in Example 7 | 3 |
| Acrylonitrile | 13 |
| Glycidylmethacrylate | 2 |
| Azabisisobutylnitrile | 0.15 |
| Dimethylformamide | 81.15 |
| | 100.00 |

According to the above formulation, first of all, the addition-polymerizable red pigments was dissolved into dimethylformamide in a reaction vessel, the solution was then added with both monomers and polymerization initiator and further the polymerization was carried out at 60° C. 3 hrs. and then 80° C. 4 hrs. Red resinous solution was obtained.

Example 10

19 parts of 4-nitrophthalimide was dissolved into 95 parts of acetone and the solution was added with 15.8 parts of pyridine. 12.6 parts of methacrylic chloride was added to the solution drop-wisely within 20 minutes at the temperature of 0° C. constant.

After 5 hrs. stirring, the filtering and washing were carried out to obtain N-acryl-(4-nitro)-phthalimide.

N-acryl-(4-amino)-phthalimide was prepared by the reduction of N-acryl-(4-nitro)-phthalimide obtained above, with both stannous chloride and hydrochloric acid.

Yellow pigment having an addition-polymerizable group was prepared by coupling the diazotized N-acryl-(4-amino)-phthalimide with the grounder which was composed of acetoacetometaxylidide/sodium hydroxide solution, according to the ordinary method of coupling.

The following components were polymerized at 60° C. 3 hrs. and then 80° C. 1 hr. to obtain yellow resinous solution.

Example 11

A polymerization was carried out as set forth in Example 7 but using the addition-polymerizable yellow pigment produced by the process of Example 10.

200 parts of melamine and 400 parts of formalin were reacted together in 240 parts of water at the reaction temperature of 80° C. Clear solution was obtained within 10 minutes and kept more than 5 minutes. After cooling them to 45° C., 14 parts of sulfamic acid were added. By keeping them for 10 minutes, white resinous precipitate was appeared when one drop of reactant was dropped into a vast quantity of water. Then, 40 parts of 20% aqueous sodium hydroxide solution were added to make the pH of the solution to about 10. The solution was no cloud in a great quantity of cold water. After cooling them to a room temperature, the resin solution was obtained by the addition of 100 parts of methanol.

50 parts of 2% diazotized copper phthalocyanine aqueous solution which was synthesized according to a method described in Example 1 and 20 parts of the resin solution obtained from the method described above were reacted together in 150 parts of water. Spontaneously, by the addition of 250 parts of 5% aqueous sodium carbonate solution slowly into them, carefully regulated the pH of the reactant to about 10.

While, as the reactant was kept for 10 hours later, the precipitate was isolated from the reactant and dried in rather lower temperature. A blue resinous powder was obtained.

By dissolving this powder into acetic acid, blue color acetic acid solution was obtained.

Example 12

The following components were mixed together:

| | Parts |
|---|---|
| 5% solution of reactive color which was obtained according to the method described in Example 1 | 35.0 |
| Polyethylene glycol alkyl ether | 1.0 |
| Mineral turpene | 64.0 |
| | 100.0 |

The mixture thus obtained was vigorously stirred in a homogenizing mixer to prepare an oil-in-water type of emulsion for use as a textile printing paste. This emulsion was printed on a cloth by a printing machine, dried on a steam cylinder and heated at 130° C. for 5 minutes in an air to obtain a clear blue printed cloth having high resistance against abrasion, washing and organic solvents.

Example 13

In a reaction vessel, a latex of approximately 28% resin content was prepared in accordance with the following formulation by an emulsion polymerization.

| | Parts |
|---|---|
| N-methylolacrylamide | 2.0 |
| Butyl acrylate | 13.0 |
| Vinylidene chloride | 13.0 |
| Sodium hydroxide | 0.2 |
| Potassium phosphate | 0.8 |
| Sodium alkylarylsulfonate | 0.95 |
| Sodium persulfate | 0.05 |
| Water | 70.00 |
| | 100.00 |

The following components were then mixed together:

| | Parts |
|---|---|
| 5% solution of reactive color which was obtained according to the method described in Example 2 | 30 |
| Latex prepared above | 10 |
| Polyethylene glycol nonylphenyl ether | 1 |
| Mineral turpene | 59 |
| | 100 |

The mixture thus formed was strongly stirred in a homogenizing mixer to prepare an oil-in-water type of emulsion for use as a textile printing paste.

This emulsion was printed on a cloth by a printing machine, dried on a steam cylinder and heated at 130° C., for 5 minutes in an air to obtain clear blue printed cloth having a high resistance against abrasion, washing and organic solvents.

Example 14

The reactive color solution prepared according to the method described in Example 2 was added with hydrochloric acid to acidify it or was added with aqueous solution of barium chloride and thus reactive pigment paste was prepared as the precipitate.

The following components were mixed together:

| | Parts |
|---|---|
| The above reactive pigment paste (pure pigment content 25%) | 80 |
| Polyethylene glycol nonyl phenyl ether | 20 |
| | 100 |

The mixture was vigorously stirred in a homogenizing mixer to prepare a water-dispersible reactive pigment slurry.

Further, the following components were mixed together:

| | Parts |
|---|---|
| The above water-dispersible reactive pigment slurry | 10 |
| The latex prepared according to the method described in Example 13 | 27 |
| 2% aqueous solution of hexamethylene bis-ethylene urea | 3 |
| Mineral terpene | 60 |
| | 100 |

The mixture was strongly stirred in a homogenizing mixer to prepare an oil-in-water type of emulsion for use as a textile printing paste.

This emulsion was printed on a cloth by a printing machine, dried on a steam cylinder and then heated at 130° C. for 5 minutes in an air to obtain a clear blue printed cloth having high resistance against abrasion, washing and organic solvents.

Example 15

| | Parts |
|---|---|
| Glycidylmethacrylate | 4.0 |
| Acrylamide | 1.0 |
| Butylacrylate | 25.0 |
| Sodium alkylarylsulfonate | 0.9 |
| Ammonium persulfate | 0.1 |
| Water | 69.0 |
| | 100.0 |

The above components were reacted together at 70–80° C. for 6 hours in an emulsion polymerization vessel. The latex is thus prepared with about 28% of resin content.

The following components were mixed together:

| | Parts |
|---|---|
| 5% solution of reactive color prepared according to the method described in Example 7 | 25 |
| The latex prepared described in above | 5 |
| Mineral terpene | 70 |
| | 100 |

The mixture was strongly stirred in a homogenizing mixer to prepare an oil-in-water type of emulsion for use as a textile printing paste.

This emulsion was printed on a cloth by a silk-screen printing machine, dried on a steam cylinder, and after dipping the cloth in a 0.2% aqueous sodium hydroxide solution it was heated and dried to obtain a clear red printed cloth having high resistance against abrasion, washing and organic solvents.

*Example 16*

The following components were mixed together:

| | Parts |
|---|---|
| Reactive color solution prepared according to the method described in Example 10 | 25 |
| 2% aqueous solution of hexamethylene bis-ethylene urea | 5 |
| Polyethyleneglycol alkylether | 1 |
| Mineral terpene | 69 |
| | 100 |

The mixture was strongly stirred in a homogenizing mixer to prepare an oil-in water type of emulsion for use as a textile printing paste.

This emulsion was printed on warps using only a screen-printing machine, the printed warps being dried on a steam cylinder and heated. Then, they were woven together with white or colored wefts to obtain a clear and beautiful screen printed cloth having high resistance against chemicals and physical properties.

*Example 17*

The following components were mixed together:

| | Parts |
|---|---|
| Stannous chloride | 5 |
| Urea | 3 |
| Water | 31 |
| Polyethyleneglycol nonylphenylether | 1 |
| Mineral terpene | 60 |
| | 100 |

The mixture was stirred in a homegenizing mixer to prepare an oil-in-water type of emulsion for use as a resistant printing paste.

| | Parts |
|---|---|
| Above oil-in-water type of emulsion | 90 |
| 5% solution of reactive color prepared according to the method described in Example 2 | 10 |
| | 100 |

The above components were mixed together to prepare a resistant color printing paste.

After immersing a white cloth in Naphthol AS (3-hydroxy-2-naphthoicanilide) solution, the so immersed cloth was printed with the above-described resistant color printing paste and dried on a steam cylinder. The cloth was then colored in a developer solution and washed. After eliminating the excess of Naphthol AS with 0.2% aqueous solution of sodium hydroxide, the colored cloth was washed and dried on a steam cylinder to obtain clear colored cloth having high resistance against abrasion, washing and organic solvents.

*Example 18*

The following components were mixed together:

| | Parts |
|---|---|
| 5% aqueous solution of methylcelullose | 50 |
| 10% solution of reactive color prepared by the method described in Example 1 | 20 |
| Zinc oxide paste (1:1) | 20 |
| Water | 10 |
| | 100 |

The resistant printing paste thus obtained was printed on a cloth. After drying and heat-treating it, the cloth was steeped into an aniline padding solution which consisted of the following components:

| | Parts |
|---|---|
| 3% methylcellulose aqueous solution | 8 |
| Aniline oil | 0.5 |
| Aniline salt | 8.5 |
| Potasium ferrocyanide | 5.4 |
| Sodium chlorate | 2 |
| Water | 74.6 |
| | 100.0 |

And the cloth was dried on a steam cylinder for 15 minutes, then treated with sodium dichromate solution at 50° C. After washing and boiling it, a clear blue resistant colored cloth was obtained.

*Example 19*

The following components were mixed together to prepare a paste:

| | Parts |
|---|---|
| Ammonia | 2 |
| Water | 32 |
| Polyethyleneglycol octylphenylether | 1 |
| Mineral turpene | 65 |
| | 100 |

And the following components were mixed together:

| | Parts |
|---|---|
| 5% solution of blue reactive color prepared according to the method described in Example 1 | 10 |
| Above paste | 75 |
| Rongalite solution (1:1) | 15 |
| | 100 |

After the mixture was printed on a cloth which was already dyed with direct dyestuff, and the cloth was dried on a steam cylinder, heated for 5–15 minutes according to an ordinary steam-heating treatment, washed and dried to obtain a clear and beautiful discharged printed cloth having an excellent resistance for chemicals and excellent physical properties.

*Example 20*

A printing paste which consisted of:

| | Parts |
|---|---|
| 5% reactive color solution described in Example 1 | 35 |
| Polyethyleneglycol alkylether | 1 |
| Mineral turpene | 64 |
| | 100 | was printed on a refined and bleached cloth, and after the cloth was dried on a steam cylinder, the mixture of the following components was

| | Parts |
|---|---|
| Rapitogen dyestuff (Red) | 5 |
| Methanol | 5 |
| 38° Bé aqueous sodium hydroxide solution | 3 |
| Water | 12 |
| 5% aqueous solution of methylcellulose | 75 |
| | 100 | printed on it. Then the cloth was heated in the rapid-ager so as to develop the color. Red and blue patterned cloth was obtained through washing, soaping, washing and drying methods.

Example 21

Water was penetrated into a mixed spun cloth of terephthalic fibers and cotton fibers before the cloth was steeped in the Jigger with a reactive color solution prepared according to the method described in Example 1 and with 200 l. of water (Ratio 1:4). Dyeing was carried out so that a desired color was obtained under the elevated temperature.

After dyed the cloth was washed and dried on the steam cylinder, then heated at 130° C. for 5 minutes to obtain a clear blue printed cloth having high resistance against abrasion, washing and organic solvents.

Example 22

95 parts of 3% aqueous solution of reactive color prepared according to the method described in Example 7 and 5 parts of 10% aqueous solution of melamine-formalin condensate were mixed together wtih 20 times of water to prepare a dyeing bath.

After the refined and bleached cotton yarn was dyed with the above dyeing bath at 130° C. for 5 minutes, there was obtained a beautiful red printed cloth having high chemical and physical resistance.

Example 23

The following components were mixed together:

| | Parts |
|---|---|
| 10% acetic acid solution of reactive color prepared according to the method described in Example 11 | 30 |
| Polyethylenegylcol laurylether | 1 |
| Mineral turpene | 39 |
| 50% xylene solution of long-oil alkyd resin | 30 |
| | 100 |

The mixture was strongly stirred in a homogenized mixer to prepare an oil-in-water type printing paste.

This paste was printed on a non-woven fabric which was prepared by using the various binders together with synthetic fibers polyacrylnitrile, polyamide, polyester, etc. and natural fibers (for example, cotton). Then the fabrics were dried on a steam cylinder and heated at 130° C. for 5 minutes in an air to obtain a clear and brilliant blue color printed non-woven fabric having the excellent chemical and physical properties.

Example 24

3% of pulp solution was prepared by fully beating the pulp in a beater and was made up 100 parts by the addition of water.

After the solution was blended together with 10 parts of the mixture which consisted of rosin-scap, titanium dioxide and 5% aqueous solution of reactive color prepared according to the method described in Example 2, and adjusted the pH of the pulp solution to slightly acid (pH=4.5–5.0) by adding 0.2 parts of aluminum sulfate, the reactive color was thoroughly fixed.

A colored paper with 130 g./m.$^2$ was manufactured by a paper-making machine.

According to the method of this example, the obtained paper was very strong than that of prior art, so that the deterioration of a paper was eliminated by increasing percent-yield of the filler.

Example 25

The mixture consisted of the following components:

| | Parts |
|---|---|
| Latex prepared according to the method described in Example 13 | 80 |
| 10% solution of reactive color prepared according to the method described in Example 2 | 20 |
| | 100 | was vigorously stirred in a mixer.

The mixture was homogeneously sprayed on a random-web consisted of 75% of nylon and 25% of staple-fiber and the web was dried at 130° C. for 10 minutes to obtain strong and soft blue colored non-woven fabrics having the excellent properties.

Example 26

358 parts of 4.8% aqueous sodium hydroxide solution and 80 parts of cellulose xanthate were mixed together and made up to 438 parts. 10 parts of 5% solution of reactive color prepared according to the method described in Example 1 and 0.3 parts of titanium dioxide were mixed with the solution obtained above, and after filtering and defoaming, it was spun out into a common coagulation bath and drawing the fiber with stretch in the second bath at 80–90° C. After washing and drying at 50–60° C. for 3 hours, blue viscose rayon was obtained.

According to the method described above, such defects as falling out of the pigment in coagulation bath or limit in particle size used, may be completely eliminated.

Example 27

80 parts of polyvinyl alcohol which were completely free from sodium acetate, were charged in the dissolver and diluted to 15% solution by an addition of 453 parts of water. Polyvinyl alcohol was completely dissolved either by adjusting the pH of the solution to lightly alkaline (pH=8—9) and by keeping the solution at 60–80° C. for 10–15 hours.

The solution obtained was stirred vigorously together with 10 parts of 5% solution of the reactive color prepared according to the method described in Example 1, a homogeneous solution was thus obtained.

After filtering and defoaming, the solution was spun out into a coagulation bath, heated at 200–300° C., for a few minutes and acetalized to obtain a blue colored polyvinyl fiber.

According to the method described above, such defects as falling out of the pigment in the coagulation bath or limit in particle size used, may be completely eliminated.

Example 28

5 parts of 10% dimethylformamide solution of the reactive color prepared according to the method described in Example 9 and 95 parts of 10% dimethylformamide solution of polyacrylnitrile were mixed together to obtain a homogeneous solution.

The solution was spun to a clear red colored yarn by a conventional wet yarn spinning process. A clear and beautiful red polyacrylnitrile yarn was thus obtained.

Example 29

Printing ink for cellulose or polyethylene film was prepared from the following components:

| | Parts |
|---|---|
| 80% solution of the oil-soluble reactive color described in Example 8 | 10 |
| Polyamide condensate | 30 |
| Butanol | 30 |
| Toluene | 30 |
| | 100 |

The above reactive color was composed of self-crosslinkable resin attached many of the pigment molecules to form a pigment particle, as it were. Therefore, the red colored prints obtained by a gravure printing had the excellent properties against rub, solvent and outdoor exposure.

*Example 30*

| | Parts |
|---|---|
| The reactive color described in Example 6 | 27.9 |
| Barium sulfate | 13.1 |
| Printing ink varnish | 59.0 |
| | 100.0 |

Offset printing ink was prepared from the formula above by mixing them with 3-rolled mill.

The above reactive color was composed of self-cross-linkable resin attached many of the pigment molecules and having the organophilic group in its component, so the color was dispersed well into a printing ink varnish. Thus obtained printing ink had an excellent tinting strength, and also had an excellent printability. Blue color prints were obtained by offset printing and had outstanding rub-fastness, light-fastness and other physical and chemical properties.

*Example 31*

An oil-in-water type emulsion printing ink was obtained from the following composition:

| | Parts |
|---|---|
| 5% solution of yellow reactive color described in Example 10 | 35 |
| Polyethyleneglycol alkylether | 1 |
| Xylol | 64 |
| | 100 |

This emulsion was printed on a paper by a gravure printing and as a result a beautiful print was obtained by heating to dry. The color was so firmly fixed on a paper fiber by the reaction of it with fiber, that the paper printed had excellent properties against bleeding, rubbing, solvents and outdoor exposure.

*Example 32*

A water base printing ink was obtained by thoroughly mixing the following components on a colloid mill:

| | Parts |
|---|---|
| 5% reactive color solution described in Example 2 | 35 |
| Gum arabic | 50 |
| Water | 15 |
| | 100 |

The printing ink was printed on a paper to obtain a wall-paper by flexographic printing. By heating the paper to dry, the color was so firmly fixed on the paper fiber by the reaction of it with the fiber, the paper printed had excellent properties against bleeding, rubbing, solvents and outdoor exposure.

*Example 33*

5% aqueous solution of the reactive color described in Example 2 was sprayed uniformly on a surface of a leather by a high pressure spray gun and the leather was dried in an open air to obtain a blue colored leather.

*Example 34*

| | Parts |
|---|---|
| 8% blue reactive color solution described in Example 2 | 35.0 |
| Polyethylenegylcol alkylether | 1.0 |
| Mineral turpene | 64.0 |
| | 100.0 |

The above components were mixed together and strongly stirred in a homogenized mixer to obtain an oil-in-water type blue emulsion printing paste.

The paste was printed on the de-fatted leather. After the drying of it in an open air at 40° C. a blue printed leather was obtained.

*Example 35*

10 parts of the reactive color prepared according to the method described in Example 7 was dissolved into 200 parts of water.

The de-fatted leather was dipped in the solution at a room temperature for 5 minutes. After the drying of it at 40° C. the dip-dyed red color leather having an excellent fastness was obtained which was superior in properties than the one obtained from a conventional method. It had much gloss with only a calender-treating. According to this example dyeing temperature may be rather low comparing with that of a conventional method so it is very economical.

*Example 36*

Acetone was added to a reactive color prepared in accordance with the method described in Example 1 to obtain precipitate. After the washing it about twice, glycerine and well-known suitable additives were mixed together in it and a stamping ink was thus obtained.

The printed patterns with this ink on paper or cloth by a well-known printing method had excellent properties in light-fastness and chemical resistance.

*Example 37*

| | Parts |
|---|---|
| The oil soluble resinous color powder prepared according to the method described in Example 6 | 80 |
| Linseed oil | 20 |
| | 100 |

The above components were blended and tubed to obtain an oil paint. This paint had excellent dispersibility concentration and gloss. By a usual method the picture painted with this had bright hues and strong rub-fastness and also excellent light-fastness.

*Example 38*

| | Parts |
|---|---|
| 10% solution of the reactive color prepared according to the method described in Example 10 | 50 |
| 30% aqueous gum arabic solution | 30 |
| Glyceline | 20 |
| | 100 |

The above components were mixed together to obtain a water paint. Painting was carried out with the paint which was suitably diluted with water. The picture was excellent in rub-fastness because the yellow reactive color reacted with and fixed on cellulose in paper. This picture had bright hues, strong light-fastness and excellent chemical resistance.

*Example 39*

10 parts of oil soluble color prepared according to the method described in Example 4, 30 parts of alkyd resin, 35 parts of butanol and 25 parts of toluole were blended together in a dissolver to obtain printing ink for hardboard printing.

The printing ink was printed on the well-base coated hardboard by a gravure-offset printing machine. The board was dried in open air and heated by hot air to obtain a blue colored hardboard having excellent coloring and strong rub-fastness.

According to the conventional method of hardboard printing, a clear resin top-coating over printed surface is required. However, according to this method of printing, prints having an excellent rub-fastness were obtained without treating with clear resin top-coat.

*Example 40*

To an acetic acid solution of blue reactive color described in Example 11, wooden chips were dipped and dried to obtain a blue colored chip having strong fastness for outdoor exposure.

Example 41

A wooden product was uniformly sprayed with blue reactive color solution prepared according to the method described in Example 3 by a high-pressure spraying-gun.

After the drying of wood products in open air, a blue colored wooden product was obtained, having an excellent fastness.

Example 42

Polyvinyl acetate emulsion was prepared by polymerizing the following components:

|  | Parts |
|---|---|
| 5% aqueous solution of polyvinyl alcohol | 200 |
| Vinyl acetate | 100 |
| Potassium persulfate | 0.7 |
| Dimethylphthalate | 10 |
|  | 310.7 |

9 parts of titanium dioxide, 10 parts of water and 5 parts of 5% aqueous solution of sodium phosphate were mixed together with the polyvinylacetate emulsion prepared above to obtain a white polyvinylacetate emulsion polymeriation paint. After adding them a blue reactive color prepared according to the method described in Example 2, the blue emulsion paint obtained was applied on the wooden product to obtain a blue colored beautiful wooden product having an excellent outdoor durability.

Example 43

6 parts of casein and 10 parts of starch were mixed together with 30 parts of water. After making them swell, 20 parts of 5% aqueous solution of sodium hydroxide was mixed with them and heated at 60° C. to dissolve the casein and starch to make a clear solution.

50 parts of 3% aqueous solution of sodium oleate was mixed to prepare a concentrated solution of soluble casein paint.

Mixing the blue reactive color, prepared according to the method described in Example 1 with this paint and the mixture was stirred.

Wooden-chip was painted with this paint, and air-dried to obtain a blue wooden-chip having an excellent outdoor durability.

Example 44

|  | Parts |
|---|---|
| Soya oil modified alkyd resin varnish | 100 |
| Titanium dioxide | 50 |

Above components were blended on a roll-mill to make a paste.

|  | Parts |
|---|---|
| Above paste | 1 |
| Soya oil modified alkyd resin varnish | 60 |
| Butylated melamine resin | 20 |
| Titanium dioxide | 8 |
| Xylene | 2 |

Above components were mixed and the mixture was added with 4 parts of green reactive color prepared according to the method described in Example 5, and 6 parts of xylene to obtain a homogeneous solution.

The mixture was coated on an aluminum-plate. After heating it at 130° C. for 20 minutes, a green colored aluminum plate was obtained having an excellent fastness.

Example 45

The mixture composed of 300 parts of 38% Formalin and 100 parts of urea was boiled for 4 hours at 40–45° C. After evaporating off the moisture from the mixture, the mixture was distillated under a reduced pressure to obtain a transparent and sticky condensate as a residue of the distillation. After the condensate was dissolved into an alcohol, the thus-prepared resins solution was applied over the boards.

The top board was dipped in the resin-solution which was dissolved, a blue reactive color was prepared according to the method described in Example 1.

After the air-drying of it, each wooden board was laminated on and pressed at 130° C., under the pressure of 1,500 lbs./in.², a blue colored laminated board having an excellent property was thus obtained.

Example 46

90 parts of rubber-latex which had adjusted with water to 25% rubber content and 10 parts of the blue latex prepared according to the method described in Example 3 were mixed homogeneously to obtain a colored rubber latex.

By coagulating and after treating them by an ordinal method, to obtain a beautiful colored rubber.

According to this method, the crosslinking of the crude rubber was so much accelerated with heat of vulcanization that the resulting rubber was free from the deterioration and oxidation which often happened by means of an ordinal method of coloring.

Example 47

The following components were blended together:

|  | Part |
|---|---|
| Reactive color prepared according to the method described in Example 5 | 1 |
| Process oil | 1 | and mixed together with 100 parts of crude rubber by a 2-roll mill to obtain a beautiful green color rubber sheet.

According to this method, the rubber was exothermed to be 100–130° C. during the rolling process. The operation time required was about 15 minutes, so the cross-linking of the rubber was much accelerated. It served for reinforcing the rubber and also served for eliminating the deterioration or oxidation of rubber.

Example 48

95 parts of xylene was mixed with .5 parts of reactive color prepared according to the method described in Example 4 to obtain a blue colored solution.

By a high pressured spray-gun, the solution was sprayed on the surface of a well-dried concrete wall uniformly and the wall was dried in open air to obtain a colored concrete wall.

According to this method of coloring, the surface of concrete wall was covered with a beautiful color which had an excellent covering power. So, the color solution thus-obtained was available for any purpose of coloring of the materials made of cement, slate, mortar, etc.

What we claim is:

1. A process for coloring an article comprising the step of coloring said article with a coloring agent selected from the group consisting of: a first reactive chromogen-bonded-polymer which contains in its structure at least two water-insoluble chromogens, at least two reactive radicals capable of cross-linking with each other to form a higher polymer and capable of linking with a functional radical of an added reactive compound and of said article and at least one radical selected from solubilizing and dispersing radicals, said first polymer being made by the steps of introducing a diazonium radical into a water-insoluble chromogen to form a diazonium compound thereof and polymerizing an addition-polymerizable monomer containing at least partly a monomer having a reactive radical using said diazonium compound as the initiator for said polymerizing, a second reactive chromogen-bonded-polymer which contains in its structure at least two water insoluble chromogens, at least two reactive radicals capable of cross-linking with each other to form a higher polymer and capable of linking with a functional radical of an added reactive compound and of said article and at least one radical selected from solubilizing and dispersing radicals, said second polymer being made by the steps of introducing a diazonium radical into a water-insoluble chromogen to form a diazonium compound thereof, polymerizing an addition-polymerizable monomer containing at least partly a monomer having a reactive radical using said diazonium compound as an initiator for said polymerizing, and reacting the chromogen-bonded-polymer resulting from said polymerization with a compound which is capable of introducing a reactive radical into said last-named polymer by reaction with said polymer, a third reactive chromogen-bonded-polymer which contains in its structure at least two water-insoluble chromogens, at least two reactive radicals capable of cross-linking with each other to form a higher polymer and capable of linking with a functional radical of an added reactive compound and of said article and at least one radical selected from solubilizing and dispersing radicals, said third polymer being made by the steps of introducing a diazonium radical into a water-insoluble chromogen to form a diazonium compound thereof, polymerizing an addition polymerizable monomer containing at least partly a monomer having a reactive radical using said diazonium compound as an initiator for said polymerizing, reacting the polymer obtained through said polymerizing with a compound which is capable of introducing into said last-named polymer by reaction therewith, a radical selected from the group consisting of hydrophilic and hydrophobic radicals, and a fourth reactive chromogen-bonded-polymer which contains in its structure at least two reactive radicals capable of cross-linking with each other to form a higher polymer and capable of linking with a functional radical of an added reactive compound and of said article, and at least one radical selected from solubilizing and dispersing radicals, said fourth polymer being made by the steps of introducing a diazonium radical into a water-insoluble chromogen to form a diazonium compound of said chromogen, polymerizing an addition-polymerizable monomer containing at least partly a monomer having a reactive radical using said diazonium compound as an initiator for said polymerizing, reacting the chromogen-bonded-polymer resulting from said polymerizing with a compound which is capable of introducing a reactive radical into said last-named polymer by reaction therewith, and reacting the polymer resulting from the reaction of said chromogen-bonded-polymer and said last-named compound with a compound which is capable of introducing a radical selected from the group consisting of hydrophilic and hydrophobic radicals into said last-named polymer by reaction with said polymer.

2. A process as defined in claim 1, wherein said chromogen is selected from the group consisting of phthalocyanine pigments, thionindigo pigments, anthraquinone pigments, perinone pigments, perylene pigments, dioxazine pigments, quinacridone pigments, azo coupling pigments, azo condensation pigments, sulfur pigments, and basic lake pigments.

3. A process as defined in claim 1, wherein said reactive radicals capable of cross-linking with each other to form a higher polymer and capable of linking with a functional radical of a reactive compound added and the article to be colored is selected from the group consisting of the methylol, epoxy, halohydrin, ethyleneimine, ethyleneurea, acid chloride, chlorotriazine, ketene, vinyl, isocyanate, acid azide, phenyl urethane, malonate-added-isocyanate and sodium bisulfite-added-isocyanate radicals.

4. A process as defined in claim 1, wherein said polymer constituting said reactive chromogen-bonded-polymer additionally contains in its structure at least one radical selected from the group consisting of the hydroxy, mercapto, amino, imino, carboxyl, carboamide, sulfoamide, urea, ureido, urethane and methylene dicarbonyl radicals.

5. A process according to claim 1, wherein said reactive radical of the polymer constituting said chromogen-bonded-polymer also functions as said solubilizing or dispersible radical.

6. The colored article produced by the process of claim 1.

7. A process as defined in claim 1 wherein said coloring agent is dissolved or dispersed in a vehicle to form a solution or dispersion thereof, wherein said article is treated with said solution or dispersion, and wherein said treated article is subjected to an after-treatment.

8. A process as defined in claim 7 wherein said after-treatment is heating.

9. A process as defined in claim 7 wherein said after-treatment is the addition of a catalyst.

10. A process as defined in claim 7 wherein said after-treatment is the addition of a heavy metal.

11. A process as defined in claim 7 wherein said after-treatment is a varying of the pH.

12. A process as defined in claim 7 wherein said reactive chromogen-bonded-polymer which is used has added thereto a compound having at least two functional radicals which can react therewith and the article to be colored is treated with the mixture resulting from said addition.

13. A process as defined in claim 7 wherein said reactive chromogen-bonded-polymer which is used has added thereto a primary condensate of a thermosetting resin which is capable of reacting with said polymer and the article to be colored is treated with the mixture resulting from said addition.

14. A process as defined in claim 7 wherein said reactive chromogen-bonded-polymer which is used has added thereto a thermoplastic resin and the article to be colored is treated with the mixture resulting from said addition.

15. A process as defined in claim 7 wherein said reactive chromogen-bonded-polymer which is used has added thereto a latex and the article to be colored is treated with the mixture resulting from said addition.

References Cited

UNITED STATES PATENTS

| | | | |
|---|---|---|---|
| 1,500,844 | 7/1924 | Plauson | 260—144 |
| 2,136,377 | 11/1938 | Dinklage | 260—144 |
| 3,059,987 | 10/1962 | Baumann | 8—4 |
| 3,092,435 | 6/1963 | Tessandori | 8—4 |
| 3,108,846 | 10/1963 | Utsunomiya et al. | |
| 3,177,214 | 4/1965 | Sulzer et al. | |
| 3,206,328 | 9/1965 | Shaw et al. | |

NORMAN G. TORCHIN, *Primary Examiner.*

T. J. HERBERT, *Assistant Examiner.*